Figure 1:
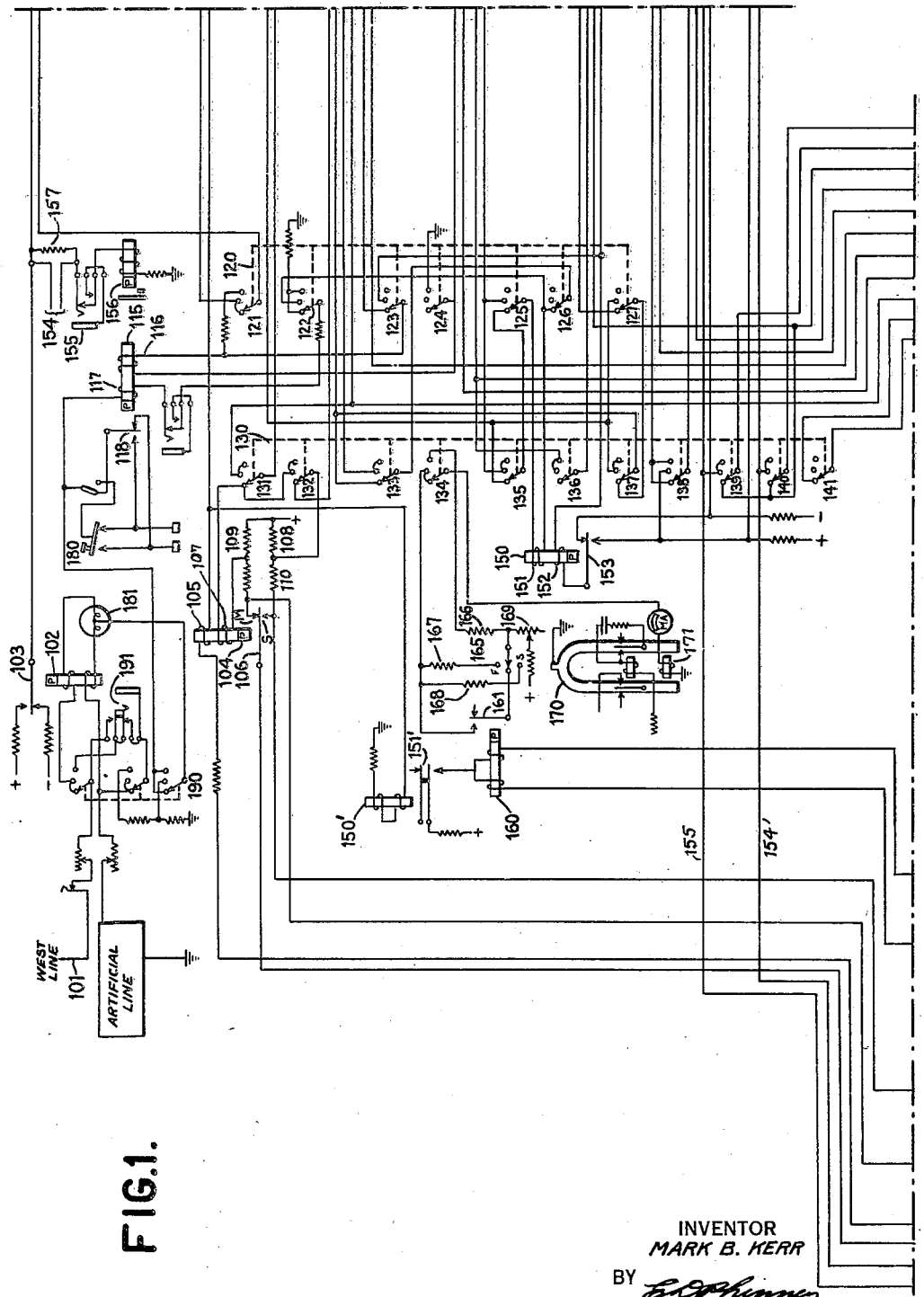

Feb. 10, 1942.  M. B. KERR  2,272,412
MULTIPLE DROP CHANNEL REPEATER
Filed Oct. 4, 1938  7 Sheets-Sheet 3

INVENTOR
MARK B. KERR
BY
ATTORNEY

Feb. 10, 1942. M. B. KER 2,272,412
MULTIPLE DROP CHANNEL REPEATER
Filed Oct. 4, 1938 7 Sheets-Sheet 4

INVENTOR
MARK B. KERR
BY
ATTORNEY

Feb. 10, 1942.　　　　M. B. KERR　　　　2,272,412
MULTIPLE DROP CHANNEL REPEATER
Filed Oct. 4, 1938　　　　7 Sheets-Sheet 5

INVENTOR
MARK B. KERR
BY
ATTORNEY

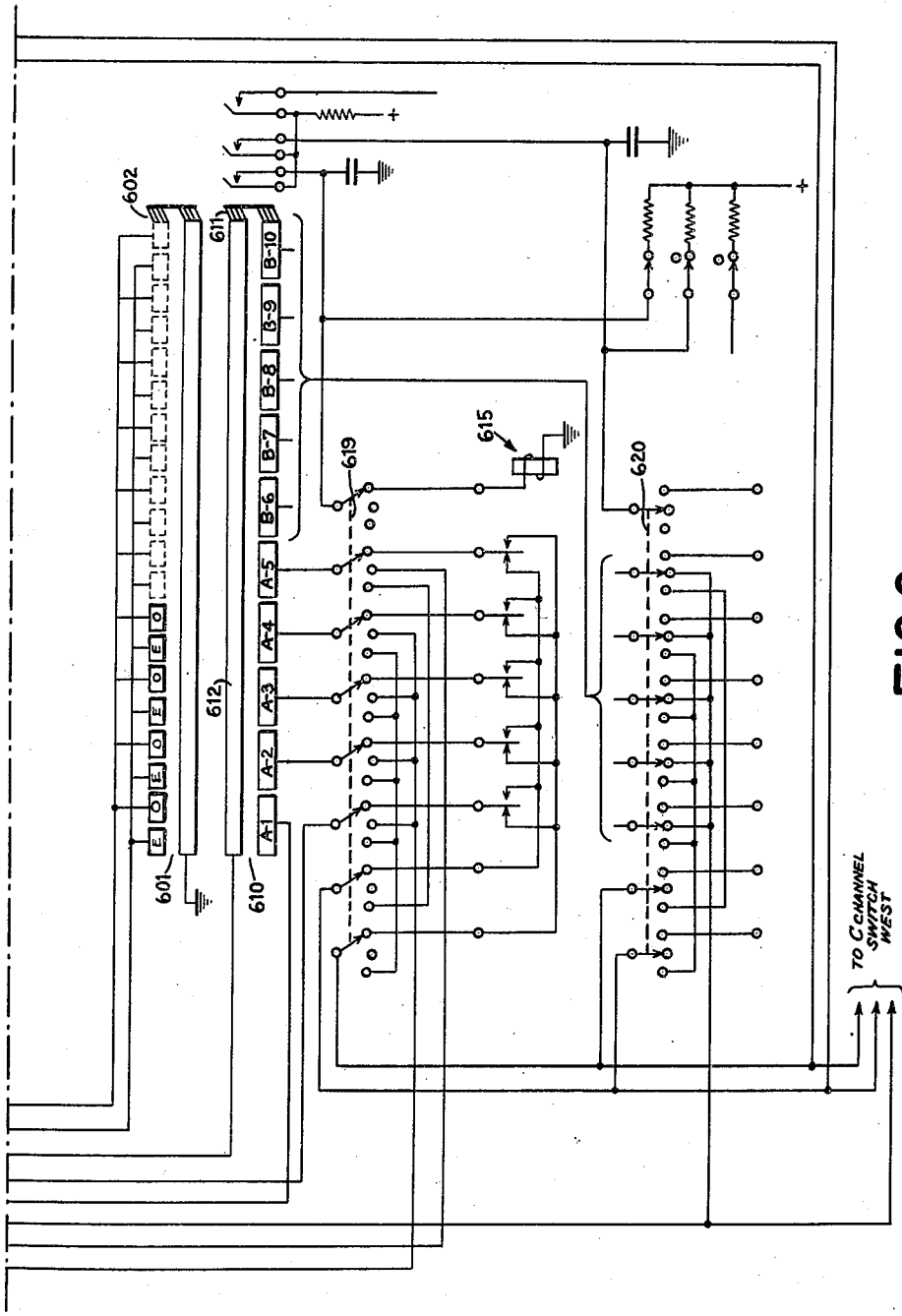

Feb. 10, 1942.   M. B. KERR   2,272,412
MULTIPLE DROP CHANNEL REPEATER
Filed Oct. 4, 1938   7 Sheets-Sheet 7
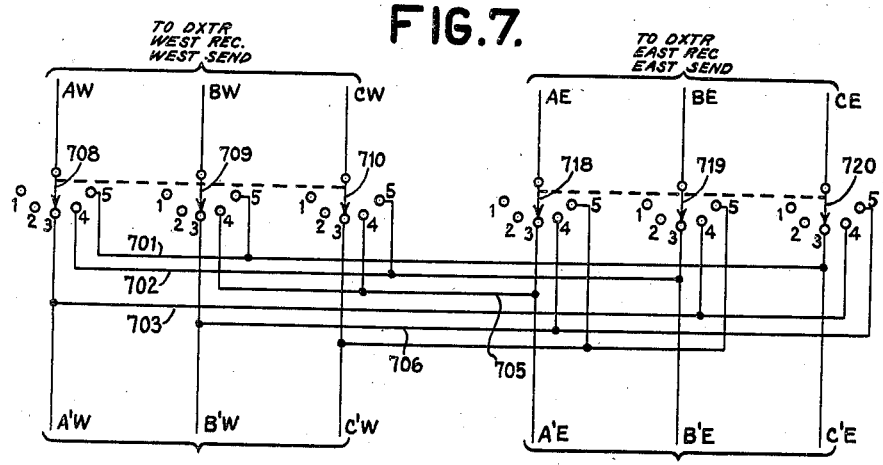
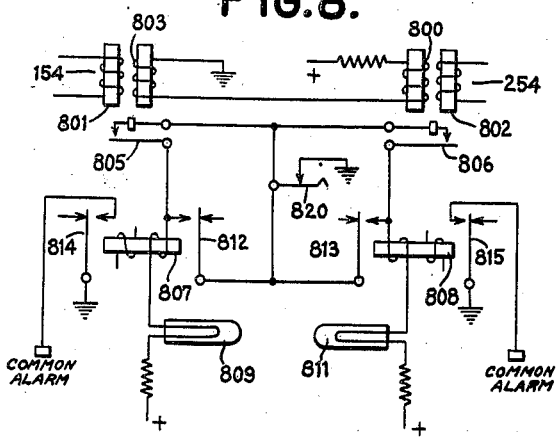
| FIG.1. | FIG.2. |
|---|---|
| FIG.3. | FIG.4. |
| FIG.5. | FIG.6. |
FIG.9.
INVENTOR
MARK B. KERR
BY
ATTORNEY Patented Feb. 10, 1942

2,272,412

UNITED STATES PATENT OFFICE 2,272,412

MULTIPLEX DROP CHANNEL REPEATER

Mark B. Kerr, Rosebank, Staten Island, N. Y., assignor to Postal Telegraph-Cable Company (New York), New York, N. Y., a corporation of New York Application October 4, 1938, Serial No. 233,169

10 Claims. (Cl. 178—52)

My invention relates to multiplex repeaters and more particularly to multiplex repeaters in which one or more channels may be terminated or dropped, at the repeater while the remaining channels are repeated.

Prior to my invention certain arrangements of this general character have been devised. However, in these prior arrangements the circuit was not readily adaptable for use on more than two channel operation. Furthermore they did not provide flexibility of operation, so that the local receiving or transmitting apparatus at the repeater could be selectively associated with several different channels. These previously used arrangements were not susceptible to expansion to cover more than two channels nor did they provide flexibility of operation that is afforded according to my invention.

In operating any multiplex repeater arrangement after service has been interrupted for some reason or other, means should be provided to synchronize the distributors with the signals transmitted over the transmission line so that the distributors are not only operated in the proper synchronous speed but also are in phase synchronism.

According to one feature of my invention I provide a means for testing the phase relationship of the signals as well as a speed control arrangement for the motor for adjusting the distributor to the proper speed.

Further in any type of repeater circuit if a failure occurs in one section of the line, the signals coming through the line may be badly distorted and accordingly as received will form a meaningless jumble of characters.

To overcome this another feature of my invention provides a cutting switch at the repeater so that in event of trouble in one of the line sections the other line may be terminated at the repeater and the section in which the trouble has developed may then be tested and corrected without interrupting all of the service. At the same time the cut switch is operated a signal may be transmitted over the line upon which the trouble has developed to indicate at the transmitting stations on that line that such a cut has taken place and they should stop sending.

It is a further object of my invention to provide a multiplex repeater in which means are provided to permit the repeating through of a plurality of channels or to terminate one or more of these channels locally at the repeater as desired.

It is a still further object of my invention to provide means for synchronizing the receiving distributor at the repeater, with the transmitted signals.

It is a still further object of my invention to provide a phasing arrangement operative whether or not the particular channel is repeated through or is dropped at the repeater.

It is a still further object of my invention to provide a switching arrangement to vary the speed of the driving motor controlling the distributor so as to facilitate the phasing of the repeaters.

Further objects and advantages of my invention will become apparent from a reading of the particular description made in connection with the accompanying drawings in which Figs. 1 to 6 taken together illustrate a schematic diagram of a repeater designed in accordance with the principles of my invention;

Fig. 7 illustrates a switching arrangement for cross connection of the channels, Fig. 8 illustrates a suitable call selector arrangement for use in the circuit of my repeater, and Fig. 9 illustrates the arrangement of Figs. 1-6 necessary to properly depict the schematic circuit arrangement.

In each of the figures of the drawing reference characters have been generally selected so that the first digit of each reference character corresponds to the figure of the drawing upon which it will be found. Furthermore, in each of the corresponding figures of the group of Figures 1 to 6, the corresponding parts in the related pairs of figures are provided with identical reference characters except for the first digit.

Figure 2:
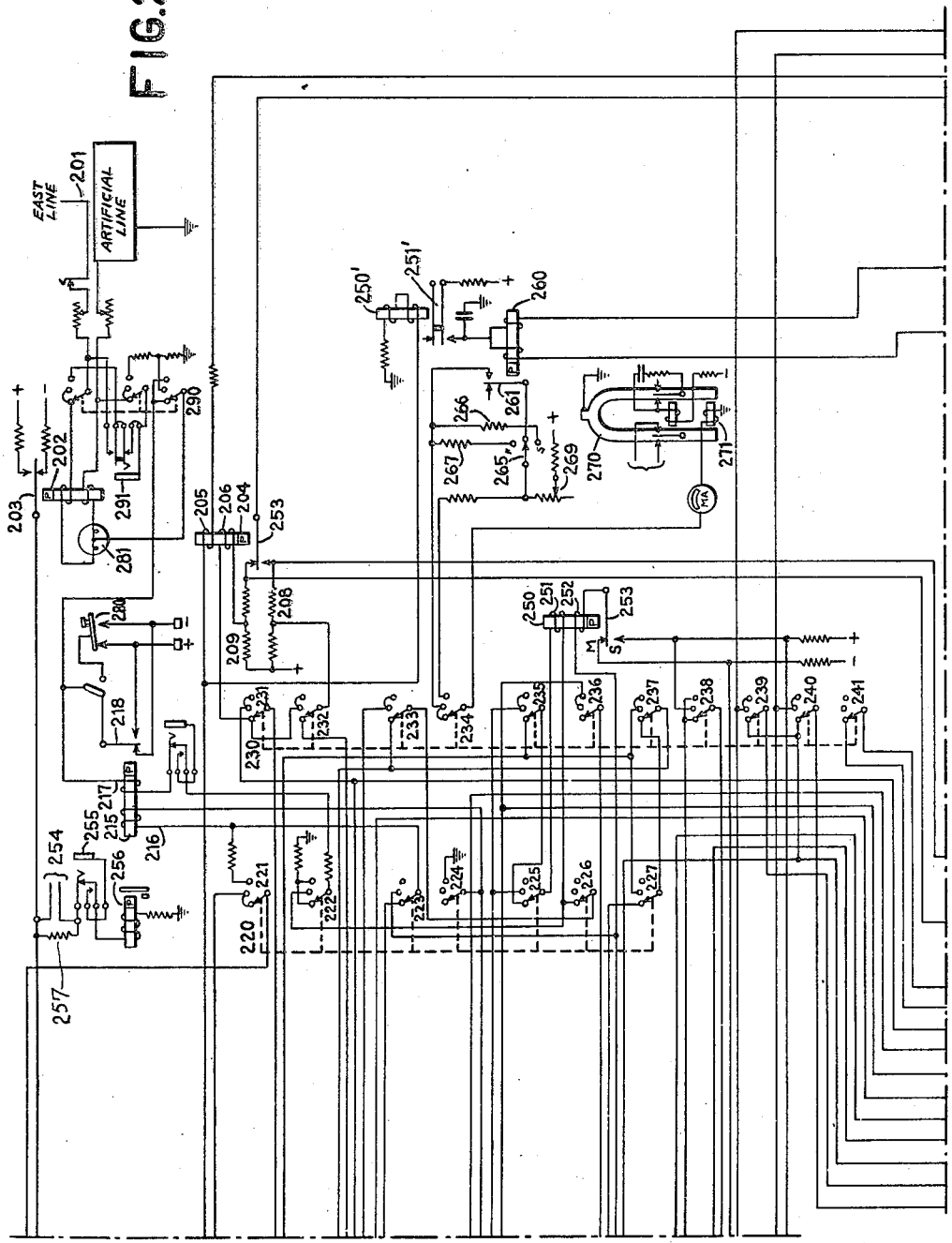

In Figs. 1 and 2 is generally illustrated the west and east lines 101, 201 associated with the west and east line relays 102, 202, the west and east pole changing or transmitting relays 115, 215, the west and east printer relays 105, 205 together with its controllable contact, the west and east cut phasing switches 130, 230 for phasing the lines or for cutting the repeater at either line and the alternating current-high speed switches 120, 220 associated with each line for transmitting unit interval current reversals or for converting the repeater to a simple polar duplex repeater using line and pole changer relays alone.

Also in Fig. 1 is illustrated a portion of the correcting circuit for utilization with the west to east line. The corresponding elements for the east to west line are illustrated in Fig. 2.

Figure 3:
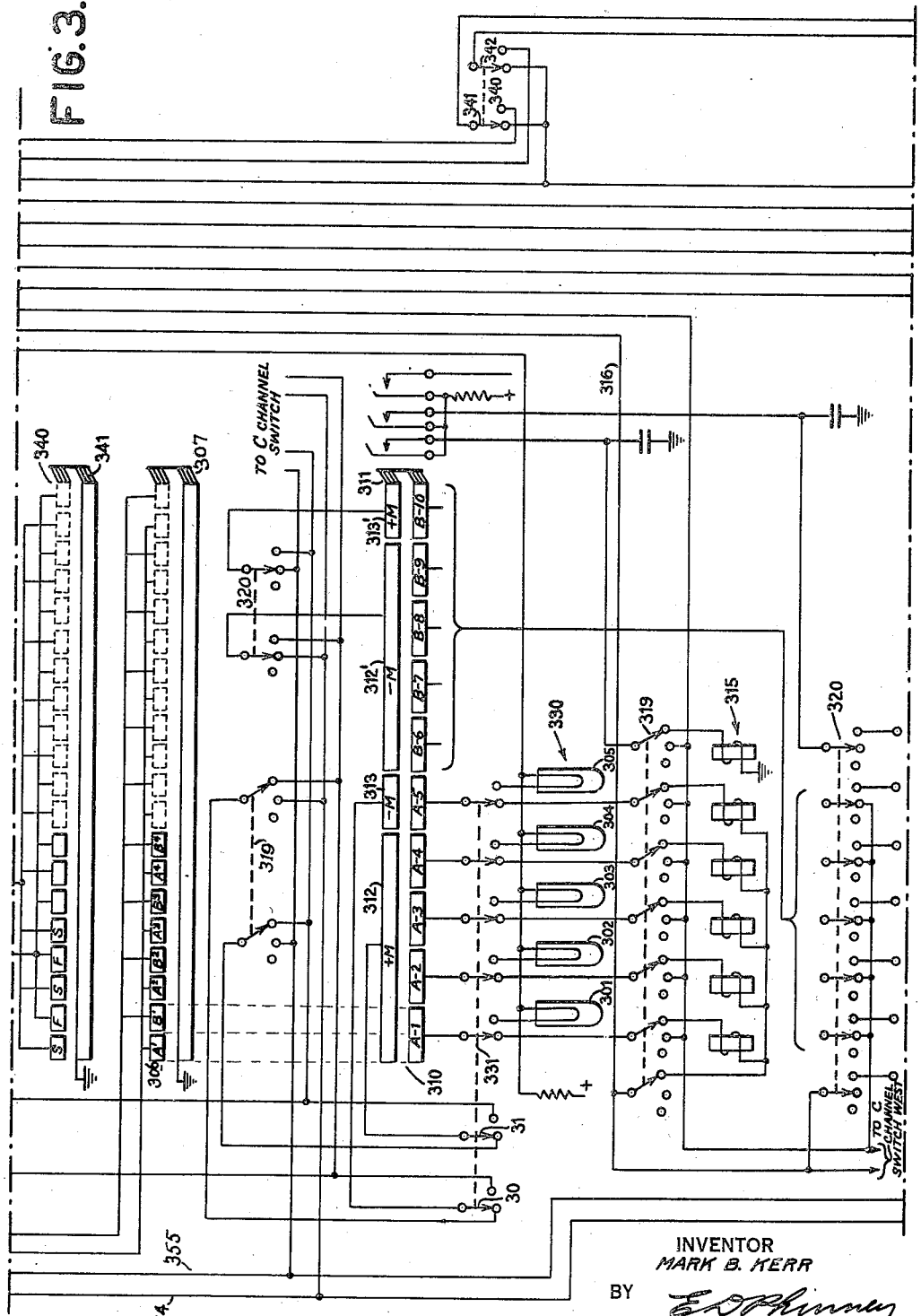
Figure 4:
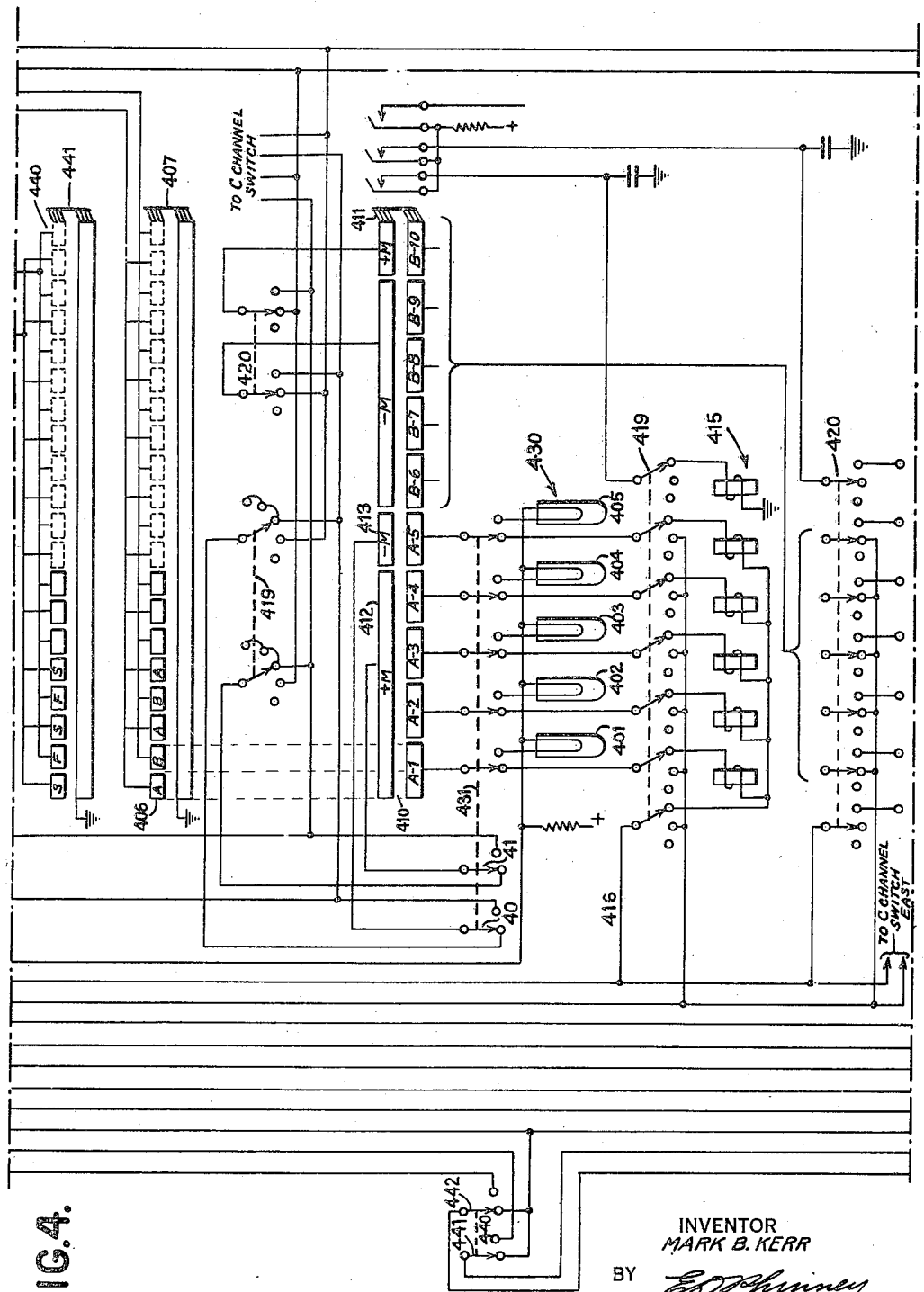

In Figs. 3 and 4 are illustrated the regenerating commutating arrangements 307, 407, the receiving distributors 310, 410, the phasing lamps 330, 430, the printers 315, 415, and switching arrangements associated therewith. In addition the corrector commutators 340, 440 are shown. These commutators cooperate with the correcting arrangements of Figs. 1 and 2, respectively, as will hereinafter be described.

Figure 5:
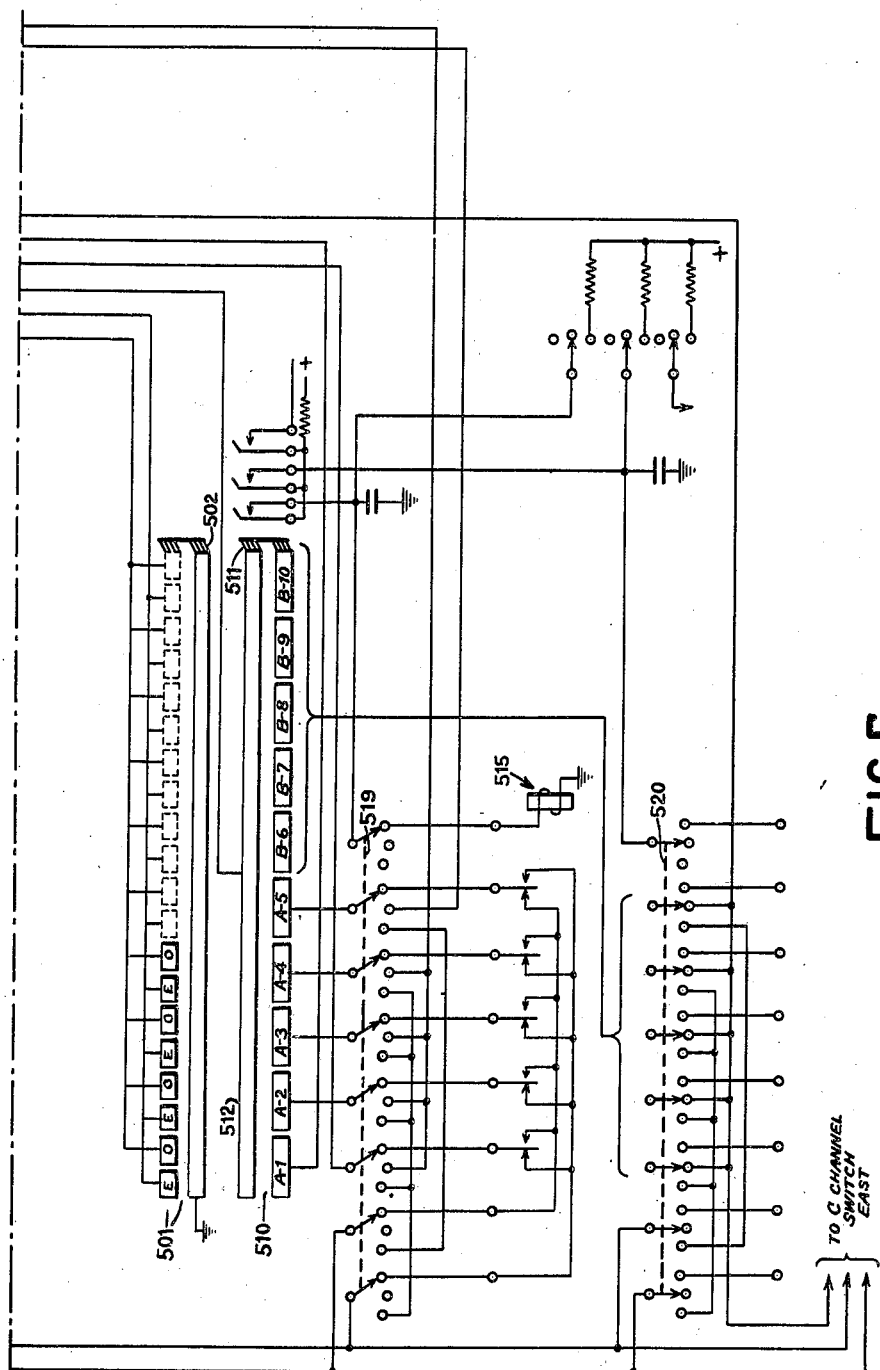

In Figs. 5 and 6 are illustrated the transmitting distributors 510 and 610, the regenerative commutators 501, 601, the transmitters 515, 615, and various switching arrangements for these circuits.

The circuit arrangement disclosed in these figures shows the complete distributor arrangement for only two channels A and B, but also indicates the connections to the C channel. It is understood that while connections for 3 channels are indicated the circuits may be expanded to include such additional channels as may be required in high speed multiplex operation. The signals incoming over the line are repeated through or dropped in accordance with the position of the switching arrangement. Likewise the signals may be regenerated and provisions are made so that the distributors will operate in the proper synchronous relation. Arrangements for properly phasing the receivers are also disclosed. These and other more specific operations of the circuit will be more fully described in the detailed description of the circuits outlined below. The description generally indicates the operation in only a single direction, such as from west to east, since it is clear that the operation in the opposite direction using the corresponding circuits is the same as that described. The designations of direction as west and east are used as a matter of convenience in describing the system to distinguish the circuits.

*West-east receiving on dropped channel*

Referring to Figs. 1-6 of the drawings, the incoming signals from the west line 101 actuate the polarized duplex line relay 102 in the well known manner. The local receiving circuit starts at the tongue 103 of the line relay, to the contacts of which are connected negative marking and positive spacing polar batteries with protective resistances in series with each. The mid or common side of the batteries is generally connected to ground in the usual manner. Disregarding for the moment the phase correction circuit and the leak sounder combined with the auxiliary signalling circuit, the receiving circuit is traced from the tongue 103 of the line relay, and contact 221 of the east A. C.-high speed switch 220, winding 105 of printer relay 104, a series resistance and receiving commutator segments B of commutator 306 to ground at the commutator brush 307. Assuming that the commutator and receiving distributor brushes are rotating at synchronous speed and are in phase with the incoming signals, the sequence of operations is as follows:

The line relay 102 reverses its position due to a reversal of polarity of the incoming signals during the time interval that commutator brush 307 is coming into contact with one of the B segments connected to the winding 105 of the printer relay 104. Thus the latter relay will follow the operation of line relay 102 almost immediately. It may be assumed, for convenience, that the operation of the line relay is from the marking to the spacing position, or opposite to that shown in the drawing. The tongue 106 of printer relay 104 will therefore move from the marking to the spacing contact.

On the closure of the next A commutator segment, the printer relay 104 will be held against the spacing (S) contact. At the same instant the brush 311 of receiving distributor 310 will be in contact with the front edge of a receiving segment. It may be assumed that the brush, at the moment, is on the first segment of channel A. The signal impulse received by line relay 102 and set up on the printer relay 104 can thus be assumed as the first impulse of the character selection on the A channel. For convenience also, it is assumed that the commutator brush 307 is on the A segment which is phased with the first half of segment $A^1$.

As the commutator brush passes from the B segment to the A segment corresponding to the first half of receiving segment A—1, the circuit through winding 105 of relay 104 is opened and the circuit to its tongue 106 is closed. While the commutator brush was passing over the preceding B segment and the tongue 106 of relay 104 was being operated to the S contact following the operation of line relay 102, the receiving distributor brush 311 was passing over the east half of the last segment of the C channel. Thus as the commutator brush passes from the B to the A segment, the receiving brush 311 has reached the beginning of segment A—1. Since printer relay 104 is on its S (spacing) contact, the selecting circuit for the first printer magnet is traced from ground, the commutator brush 307, tongue 106 and S contact of printer relay 104, switches 319 and 31, to the receiving common 312 for the first four segments of the A channel of receiving distributor 310, through the distributor brush 311, segment A—1 and first magnet of the printer 315 to the lead 316 which goes to battery through rotor 141 of west cut-phasing switch 130. In parallel with this circuit is another which serves as a lock for printer relay 104. It is traced from positive battery through the upper potentiometer resistance 109, winding 107 of printer relay, rotor 131 of the west cut-phase switch 130, rotor 235 of switch 230, rotor 225 of switch 220, winding 251 of east regeneration relay 250, rotor 226 of switch 220, rotor 233, switch 230, rotor 132 of switch 130, lower potentiometer resistance 110 and S contact and tongue 106 of printer relay 104 to ground at commutator brush 307. The values of the potentiometer resistances may, for example, be so chosen that the locking current for printer relay 104, which is also the operating current for the regenerative relay 250, will be of approximately 30 milliamperes. The relay 250 therefore operates to its S contact during the same time that the printer magnet is selected, although at the moment it takes no active part in the functioning of the circuit.

Just as commutator brush 307 passes off segment $A^1$, a new signal impulse is received on line relay 102. Let us assume that it is marking. Then, when the commutator moves to a position where segment $B^1$ is in contact with brush 307, printer relay 104 reverses its position to marking. When the segment $A^2$ has been reached, distributor brush 311 is on segment A—2 but the circuit to the second printer magnet is not closed since the connection to 312 is open, so that the magnet will not operate. The locking circuit is closed however, in parallel with the circuit through the printer magnet to battery. It starts at the lower potentiometer resistance 108 and ends at ground through the marking contact of relay 104 and commutator brush 307 of commutator 306. The direction of current flow is such as to hold printer relay 104 against its marking contact. There is also a small leakage current from battery through rotor 141 of switch 130 the printer magnet, segment A—2 and S contact of the printer relay, but it is not sufficient to disturb the magnet. This current tends to increase the locking current of the printer relay.

For subsequent segments of the A channel, the operations repeat themselves as already described above, line relay 102 operating while the circuit to the printer selecting magnets is open, the printer relay 104 following an instant later and the selecting impulse being developed still later. During this time, the sending brush 511 of transmitting distributor 510 which transmits signals on to the east line 201 is traveling over the five segments of the A channel. The positive and negative potentials of line battery connected to the segments by contacts of the transmitter shown generally at 515, in accordance with a character combination, are successively applied to the conductor connected to the sending common 512, through rotor 223 of switch 220 (Fig. 2) and winding 216 of east transmitting (or pole changer) relay 215 to ground through successive E segments of the sending commutator 501 and brush 502. These commutator segments have substantially the same phase relation with respect to the incoming signals as the B segments of the receiving commutator 306. It is seen also, that a second winding 217 of the pole changer relay is connected in a leak current from the tongue 218 to ground at the resistance connected to rotor 222 on switch 220. The polarity of current which flows through this winding is always such as to hold the relay in the position to which it has been operated by the impulse from the sending distributor.

*West-east transmission over repeated channels*

When the receiving distributor brush reaches the end of channel A, and assuming that channel B is switched for through operation, we have the following sequence of operations:

It is seen that the conductors from the M and S contacts of the printer relay 104 are disconnected from the common segments of the second channel and that instead these segments, 312' and 313', are connected directly to negative and positive batteries respectively through the east transmitter battery protective resistances. Therefore, as soon as the receiving brush 311 passes to the first segment B—6 of the B channel, printer relay 104 is automatically cut out of the circuit so far as its control of the printer selecting magnets is concerned. The individual segments B—6 to B—10 of the B channel are strapped together at switch 320 and connected to a common lead the function of which will be described presently. The regenerator relay 250 now comes into play and the printer relay 104 is used merely as the operating and locking link. The operation of the line relay 102 sets the printer relay 104 as before, while the receiving commutator brush is on a B segment. Regenerator relay 250 follows the other during the intervals the receiving commutator brush is on the A-numbered segments in the manner described above, while the printer relay 104 is held locked and disconnected from the tongue 103 of the line relay 102.

Positive and negative battery through the east pair of protective resistances are connected respectively to the spacing and marking contacts of relay 250. These same batteries and resistances supply the potentials to the east transmitters on the dropped channels over leads 254, 255 and sections of switches 519, 520, etc. The tongue 253 of relay 250 is connected through locking winding 252, and five contacts of switch 520 to the sending segments, B—6 to B—10, and of all other repeated channels strapped together at switches 519, 520, etc. Thus the setting of the relay 250 determines the polarity of the potential transmitted through sending brush 511 to the winding 216 of east transmitting relay 215. Upon the closure of the E segments of sending commutator 501, current impulses pass through the locking winding of relay 250 to hold it in its operated position and at the same time cause the operation of the transmitting relay 215. During the open intervals at the commutator, the transmitting relay 215 is held locked by means of the leak circuit described above. The sequence of operation, as described, may be summarized as follows:

(1) Line relay 102 operates.
(2) Printer relay 104 operates.
(3) Printer relay locked and regenerator relay 250 operates.
(4) Regenerator relay locked and transmitting relay 215 operates.

Because of this chain of operations, there is a delay of about one and one-half segments from the time the impulse is actually received until it is sent out. The fixed phase relation between the receiving and sending segments of ½ segment takes care of the phase displacement of one commutator segment between the operation of relay 250 and that of the transmitting relay 215.

*Operating with switch in cut position*

Turning now to the conditions which have to be met in lining up the repeater preparatory to placing it in service, and in restoring service after an interruption, attention is directed to the functions of the cut-phasing switches 130 and 230. Considering switch 130 on the east side of the repeater, it is seen that there are three positions. In the drawings the rotors are shown in the first or normal operating position. The second or center position, is used for phasing and the third position for splitting or cutting the repeater when trouble develops. Assume that a break occurs in the west line, causing the failure of signals to be received. The repeater attendant throws the switch 130 to the third position, which rearranges the circuits as follows:

(1) The locking circuit of the printer relay 104 is maintained closed through rotor 132 of switch 130, with the winding 251 of the relay 250 cut out.

(2) The common circuit 316 to the printer magnets is opened at rotor 141 of switch 130, thus cutting off the west printers.

(3) The common lead from the strapped west receiving segments of the repeated through channels is connected through rotor 131 of switch 130, rotor 235 of switch 230, rotor 225 of switch 220, winding 251 of relay 250, rotor 226 of switch 220, rotors 233 and 237 of switch 230, rotor 227 of switch 220 and rotor 136 of switch 130 to the O segment of sending commutator 501.

(4) The common lead from the strapped east receiving segments of the repeated through channels is connected through rotor 133 of switch 130, rotor 126 of switch 120, winding 151 of relay 150, in reversed direction, rotor 125 of switch 120, rotor 135 of switch 130, to ground through the O segments of sending commutator 601 and brush 602.

(5) Half correction, which will be described later on, is established through rotor 134 of switch 130.

(6) Rotors 139 and 140 operate in connection with the phasing lamp switch which will be described later.

(7) Rotor 138 of switch 130 functions only when the switch is in the center (phasing) position.

Inasmuch as negative and positive batteries are connected to the receiving common segments 312' and 313' of the repeated through channels on the east to west distributor 310, passage of the receiving brushes over the segments of repeated channels establishes potentials for setting the position of the east regenerator relay 250. On channel B, as shown in the drawings, negative battery is set up for the first four segments and positive battery for the fifth. Thus relay 250 will be set to transmit negative battery on the first four sending segments and positive on the fifth of the same channel. According to the printer code, this combination is equivalent to the unshift or "letters" signal combination. This signal is therefore transmitted out over the east line 201 and operates the distant receiving printer. It serves as a stop signal for the operator attending that channel. Immediately upon receiving such a signal he will stop the operation of the transmitter coming back in the other direction.

In the opposite direction, negative battery on the first four segments of the B channel of the east receiving distributor 410 and positive on the fifth segment will cause the reversed operation of the west regenerative relay 150 to establish four successive positive impulses followed by a negative for transmission over the west line, as receiving brush 411 passes over the segments of the B channel. This combination of polarities corresponds to the "idle" signal. Thus, the operation of switch 130 to the "cut" position, effectively splits the repeated through channels both ways, sending the "stop" signals eastward and the "idle" signals westward.

*Phasing the repeater with dropped channel*

Half correction established by rotor 134 on switch 130 sets the speed of the distributor brushes at approximately mid-way between the slow and fast limits of the corrector action by cutting out the control action of corrector relay 160, so that synchronism east of this repeater will not be disturbed and traffic between the repeater station and the east terminal can be maintained. The attendant then proceeds to establish a new line-up to the west. As soon as the multiplex signals start coming in again, switch 130 is thrown to the center or second position. This does not change the transmission to eastward at all or to westward either on the through channels, except on A channel when repeated through, but re-establishes the normal correction at rotor 134 and reverses on rotor 138 of switch 130 the polarity on the #1 impulse, sending toward the west on the east to west distributor 610. Thus, with the west transmitters on the drop channel locked up to "spacing," the idle signals will be transmitted westward from all sending distributor segments except segment #1 of channel A. Since the control for sending idle signals westward on the through channels rests with switch 130—rotors 133 and 135—before it passes to switch 230 on the other side, the operation of the latter switch will not affect relay 150 until switch 130 is restored to normal. The printer 315 on the west side still remains disconnected at rotor 141 of switch 130. It is intended in this case that phasing shall be accomplished by observing incoming signals on a group of five phasing lamps indicated generally at 330.

The phasing lamp switch 331 is inserted between the receiving segments A1—A5 of the A channel and the leads to the printer 315 on the operating table. When this switch is thrown to the right, the receiving segments are connected directly to five lamps 301–305, which are all strapped through a common resistance to positive battery. Also the leads from the marking and spacing contacts of printer relay 104 are connected to the receiving common segments 312, 313 of the A channel, regardless of whether the channel is dropped or repeated through. Thus, we have a complete receiving circuit just as it is set up for the printer. The phasing signal preferably consists of the letter E transmitted over the A channel from the distant sending terminal, with the normal idle signal on the other channels. This will cause the lighting of the first lamp only on each revolution of the brushes when the distributor is in synchronism. For all other phase relations, other combinations of lamps will be lighted on successive revolutions of the brushes. The operator throws the corrector switch 165 to the fast or slow position, F or S, depending on whether the lamp combinations indicate the distributor to be behind or ahead of its correct phase. When the distributor finally gets around to a position where lamp 301 only lights on each revolution, the corrector switch is thrown to normal to hold the distributor in phase. Then the cut-phasing switch 130 is restored to its normal position, stopping the transmission eastward of the stop signal, as well as the transmission westward of the E signal, re-establishing the common return circuit to the printers on the west dropped channels. The A printer, however, remains inoperative until the phasing lamp switch 331 is restored to normal. The distant sending terminal on the west line, noting that the E signal is no longer coming in stops the outgoing E signal, whereupon the repeater attendant throws the phasing lamp switch to normal and the circuit is ready to proceed with business.

*Phasing the repeater without dropped channel*

When the A channel is not dropped at the repeater, it is still possible to observe signals on that channel by means of the phasing lamps. In that case, the A channel switches 319, 419, 519 and 619, will be thrown to the "repeat-thru" positions corresponding to the position of the B channel switches in the drawing. Switches 319 and 619 are actually parts of the same switch, as are 419 and 519 controlled by one knob. It should also be understood that these switches are all equipped with five operating positions, as shown in Fig. 7, and are indicated with three positions merely for convenience and simplicity. The five receiving segments of the west A channel are strapped together at switch 319 and connected to contacts associated with rotor 131 on the west cut-phasing switch 130. Also, the channel receiving common segments 312, 313 are connected to positive and negative batteries through switch 319. On the east sending side the first four (A—1 to A—4) segments of the A channel will be strapped together at the channel switch 519 when thrown to the repeat-thru position and carried through rotor 341 of switch 340, which is a part of switch 331, to the terminal of the locking winding 352 of east regenerator 250. The fifth segment is carried over a separate lead from phasing lamp switch 519 to rotor 342 of switch 340 to the same common lead to the locking winding of relay 250. When phasing lamp switch 331 is thrown to the right, or lamp position, the rectifying batteries are disconnected from the receiving common segments at rotors 30 and 31, the contacts M and S of printer relay 104 are substituted and the five receiving segments are connected to the lamps 330 exactly the same as when the channel is dropped. On the other hand, the receiving segments A—1 to A5 are now disconnected from the common lead going to switch group and rotor 131 of west cut-phasing switch 130, so that when this switch is off normal, that is in the cut or phasing position, the rectifying batteries required for the transmission of the stop signal cannot get through to regenerator relay 250. Therefore, when the phasing lamp switch 331 is thrown to cut in the lamps, the rectifying batteries are brought directly to the sending segments by means of rotors 341 and 342 on switch 340, rotors 139 and 140 of switch 130 so that when the latter is thrown off normal the stop signal will be transmitted eastward on A channel. When the switch 130 is normal, transmission through the repeater, including the regenerator relay and sending segments, takes place regardless of whether the phasing lamp switch is in the normal or in the lamp position. This is desirable in the case of a three-channel drop channel repeater, for it is frequently necessary to observe the phasing on the A channel when that channel is not dropped at the repeater station.

*Unit signal current reversal transmission*

When it is necessary to send unit signal current reversals, or AC, for lining up the duplex line, for example the east line, the alternating current-high-speed switch 220, is thrown to its second or AC position. This is equivalent to moving all rotors 221–227 to the center set of terminals. This does not affect the receiving or correcting circuits. In general, this function will be employed when cut-phasing switch 230 is in the third or cut position. It is seen that rotor 227 of switch 220 establishes a closed circuit for locking winding 107 of the printer relay 104, separated from winding 251 of the regenerator relay 250, in combination with rotors 131 and 132 of the west cut-phasing switch 130 when the latter is in the normal position. Rotor 225 of switch 220 extends the upper terminal of winding 251 of the regenerator relay 250 to the O segments of the east sending commutator 501. Rotor 222 of switch 220 extends the leak circuit from the transmitting relay 215 through a suitable resistance to the other terminal of relay winding 251. Thus, it is seen that when the sending commutator brush is on an O segment, the polarity of battery connected to the tongue 218 of transmitting relay 215 sets up a current which will lock that relay but will reverse the position of regenerator relay 250. Then, as the commutator moves to bring the brush into contact with the next E segment, the polarity of battery on the tongue of regenerator relay 250 will lock itself and reverse the position of the transmitting relay 215 through a circuit traced through rotor 223 of switch 220 independent of the east sending distributor 510. In this way an alternating sequence is established by which first one relay and then the other will be operated and locked, so that the transmitting relay sends out on the east line a series of reversals of unit signal length.

*Operation as a straight duplex relay repeater*

The other or third position on the AC—HS switch is for converting the repeater to a straight duplex relay repeater, eliminating the distributors entirely. When the switch 220 is turned to the right-hand set of terminals, the tongue 103 of the west line relay 102 is connected directly to the left hand terminal of winding 216 on transmitting relay 215. Thus, the transmitting relay will follow directly each and every operation of the main line relay on the opposite side of the repeater, independent of the rest of the circuit. It is seen also that the E commutator segments of commutator 501 are short-circuited to ground at rotor 224 of switch 220. Obviously, for straight high-speed repeater operation, the AC—HS repeater switches 120 and 220 have to be thrown on both sides of the repeater to take care of transmission in both directions.

*Channel switching system*

The purpose of the channel switches is to facilitate switching a channel from the repeating through condition to the dropped condition and vice versa. Although a 3-channel drop channel repeater would not normally be operated with all three channels dropped, converting it into two terminal sets, full flexibility would not be attainable unless an operating table equipped with transmitter and printer could be operated on any channel and on either side of the repeater. Take, for example, the conditions when one channel only in each direction is dropped at the repeater. These tables may be connected in their normal assignment to the A channel east and west. Emergency or alternate traffic conditions may arise, however, which would make it necessary to connect both channel tables to the same side of the repeater. For example, there may be at night a rush of press to the east, necessitating a transfer of the westward table to the east side, in addition to the table already connected to channel A—east. With the facilities provided in the channel switches, it is merely necessary for the repeater attendant to throw the east B channel switch to pick up the west A channel table and throw the west A channel switch to the "cut-off" position. Throwing any channel switch to the "cut-off" position connects rectifying battery from the transmitter battery protective resistances to the five segments of the sending distributor corresponding to that channel. Assuming that the west A channel switch is thrown to "cut-off," the rotors of switch 519, Fig. 5, will be moved to the left hand set of terminals. Positive battery will be extended through the left hand rotor to the first four sending segments strapped together and negative to the fifth segment alone. These polarities correspond to the stop signal on A channel. Similarily, the operation of the B or C channel switches to the "cut-off" position will set up on the sending segments of the corresponding channel the proper combination of polarities to transmit the stop signal. By this means, when a west channel operating table, for example, is transferred to the east side of the repeater, leaving the west side unequipped, the stop signal can be sent westward to advise that terminal that the channel is cut off at the repeater. In Fig. 7, the cross-connections between the switches by which a channel table may be switched from one side to the other of the repeater are shown diagrammatically. Because of the large number of wires involved, the drawing has been simplified by indicating the connections to the repeater circuits by single wires designated AW, BW, CW and AE, BE, CE, for the various channels west and east respectively, and all those to the printers and transmitters on the operating table by corresponding single wires A'W, B'W, C'W and A'E, B'E, C'E. The various wires AW, BW, etc., are separately associated with the rotors of switches 708 to 710 and 718 to 720, respectively. Inasmuch as the repeater distributors operate directionally, receiving signals from one terminal and transmitting signals on to the other terminal, while the drop channel operating tables receive from and transmit messages to the same terminal, the connections between the sending sides of the distributors and the transmitters on the tables cross over at the channel switches. That places the west receiving and west sending on the west set of switches and the east receiving and sending on the east switches. In Figs. 1 to 6 the west A channel switch, for example, consists of the portions designated 319 and 619, while the east A channel switch includes the portions designated 419 and 519. Positions 1 and 2 on each of these switches correspond respectively, to a disconnect position and the repeated through position. The repeated through position corresponds to the position shown for channel B in Figs. 1 to 6 of the drawings and needs no further comment. As shown in Fig. 7, each of the separate channels both for the west and the east are in dropped position 3. That is, they are connected to the local receiving and transmitting apparatus as indicated for channel A in Figs. 1 to 6. By moving switch contact 708 to position 4 channel AW is connected over conductor 702 to the drop channel table position corresponding to channel BE as indicated at B'E. Upon movement of switch 708 to position 5 channel AW is connected through conductor 701 to the corresponding position for channel CE indicated at C'E. Similarly BW may be connected at positions 4 and 5 over conductors 705 and 701, respectively, to positions A'E and C'E. Channel CW may be connected in positions 4 and 5 to positions A'E and B'E respectively. It is thus clear that any one or combination of the channels A, B or C receiving from and sending to the west may be dropped either at their own west positions or to suitable positions on the east side as indicated above. A similar switching arrangement is provided so that the channels AE, BE and CE which receive from and send to the east may be connected through to the operating table corresponding to normal west assignment. It is clear that with this arrangement the entire system is extremely flexible so that any channel may be repeated through, dropped at the regular position or dropped to alternate positions on either of the other operating positions on the opposite side.

When all six of the channels AW, BW, CW, AE, BE and CE are connected through the corresponding switches to position 2 so that they are connected to repeat through, it is clear that the circuit becomes the equivalent of a straight regenerative repeater. However, it is considered that the cutting off of all of the dropped channels in this way should be done as an emergency or test condition only, since a much simpler type of distributor, consisting of commutators only, can be used where dropped channel operation is not desired at the repeater station.

*Corrector circuit*

Referring again to the schematic diagram of Figs. 1-6 a particular description of the correction circuit will now be made. The circuit shown here is substantially the same as the normal correction system used on multiplex apparatus in which a tuning fork operates to control the speed by means of a phonic-motor. The primary difference between the circuit shown here and those previously used, is in the particular arrangement of the slow and fast conditions applied to the fork by the corrector switches 165, 265. For this reason the details of the motor arrangement are omitted as they form no part of the invention.

Under normal operating conditions switch 165 will be in the position shown in Fig. 1. Battery applied through suitable limiting resistances is connected to the tongue 161 of the corrector relay 160 and from there the circuit passes through a contact on the relay, rotor 134, switch 130, and back to a magnet 171 associated with the tines of the fork 170. When corrector relay 160 closes contact at 161, battery is applied to fork corrector magnet 171 which speeds up the vibrations of fork 170. When the corrector relay reverses its position, the circuit to fork corrector magnet 170 is open and the fork slows down again. The proper speed is established for correction by adjusting the natural period of the fork by suitable means, such as shiftable weights attached to the tines with the corrector switch 165 turned to the slow position. A high resistance 166 is now substituted for the normal open circuit so that the receiving distributor drifts at a small speed differential slower than the distant sending distributor. The incoming signals observed on a printer, or the phasing lamps, will gradually shift contrary to the direction of motion of the distributor brushes. Having adjusted the fork to obtain the desired speed difference, which is of the order of 0.06% of the operating speed, the corrector switch is thrown to the fast position, substituting low resistance 167 for the other resistances. The fork speeds up and reverses the phase drift. The rheostat 169 in the magnet circuit is adjusted until about the same rate of drift is obtained in the forward direction as was previously established for the slow position, so that when the corrector relay is allowed to function under control of the circuit, the speed of the distributor is held at exactly the average speed of the distant sending end.

Having now described the adjustment of the tuning fork the sequence of operation of the corrector circuit will be more fully described. Upon receipt of each line reversal over the incoming line 101, line relay 102 reverses the position of its tongue 103. As the latter moves from one contact to the other, the circuit thru rotor 221 of switch 220 and windings of neutral relay 150' to ground is momentarily opened and then closed to the opposite pole of battery. This allows relay 159' to release momentarily and immediately re-operate. The momentary release of tongue 151' applies battery from positive source over contact 151' to the windings of relay 160 and over leads from one or the other of the two differential windings to the fast or slow contacts, F or S, of corrector commutator 340. If the commutator brush 341 at this moment is upon an F segment a circuit is completed through the left hand winding of relay 160 and the resulting current impulse may be assumed to be so poled that it causes corrector relay 160 to leave its tongue 161 in the position shown. The circuit for the correcting magnet 171 is held open and the fork slows down to correct a forward phase drift. However, if the brush 341 is contacting one of the S segments at this time, the winding on the right of relay 160 is energized and relay 160 closes its contact 161, completing a circuit through correcting magnet 171. Current flowing in correcting magnet 171 serves to apply a stiffening effect to the vibrating tines of the tuning fork 170 and increase slightly the speed of vibration in a well known manner. In fact there are several ways in which the speed of vibration of the tuning fork may be controlled, the method used here having been chosen as the most convenient for purposes of illustration. Very soon the corrector commutator will drift ahead of the true phase relation, the brush will be in contact with an F segment when the impulse generated by relay 150' following a line current reversal is applied to relay 160, the latter will open its contact and the cycle will repeat itself, holding the distributor substantially in synchronism with the received signals. Turning now to the special provisions of the corrector switch, it is seen that the fast and slow conditions impressed on the corrector magnet through the contacts of relay 160 are not the same as when applied by the switch in the position shown. In normal correction, with the entire circuit in synchronism, it is advantageous to set the slow and fast speed limits as wide apart as possible in order that sufficient lee-way will be provided to take care of minor changes in the natural period of the fork due to variations in voltage and temperature. In phasing a repeater, however, the speed of forward or backward drift should be made slightly less than the correction ability of succeeding repeaters and receiving terminal to follow the drift so that synchronism in the latter portion of the circuit will not be interrupted while bringing it into phase with the sending terminal at the other end. On the fast side, therefore, a low resistance compared to the normal resistance of the circuit is inserted so that the drift of the fork will be from 10% to 20% less than that established for normal correction. Similarly, on the slow side, a high resistance compared to the complete open circuit is inserted so that the fork will be held from 10% to 20% above the slow correction speed.

In adjusting the fork speed with this combination, the narrower limits are used, starting with the slow speed for adjustment of the fork weights and using the fast speed for the adjustment of the rheostat. Then when the switch is restored to normal, the slow speed becomes slower and the fast speed faster than those established by adjustment. In other words, the range of correction is increased and circuit made less sensitive to voltage and temperature changes.

*Local test circuit*

In any repeater system it is desirable that facilities be provided so that the repeater equipment may be tested locally. It is further desirable that this circuit be so dimensioned that when the line relay is disconnected from the line the impedance will be provided such that the duplex line will not be thrown out of balance. I have provided such an arrangement as shown in Figs. 1 and 2 and described below. The sending lead from the tongue 118 of the transmitting relay 115 goes through the cut-out switch on the pole-changer key 180 and the rotor of the line switch 190 to the apex 181. When the switch is shifted to the second position, the relay 115 and key 180 are disconnected, and the apex is grounded through a resistance equal to the battery taps in series with the line battery power source. This position is used for test and is normally provided on duplex circuits. When the switch is thrown to position 3, pole-changer relay 115 is connected through to the apex 181 again, but line relay 102 is disconnected from the line at the upper rotor of switch 190. The line 101 is cut through contacts of the bridge jack 191 and two resistance units to ground, one of which is equal to the resistance of the relay winding and the second to the battery taps, so that the line balance is maintained as far as the distant station is concerned. The line relay 102 will follow the operations of the pole-changer for testing the repeater locally since the lower winding remains connected to ground through the artificial line. A milliammeter attached to a cord and plug can be inserted into the bridge jack. Current from the distant station will deflect the needle. If then the attendant at the distant station should start signalling, the meter needle will start swinging. In this way the repeater attendant can keep in touch with the distant station while testing his own apparatus locally.

*Attendant calling circuit*

When the repeater is operated on a straight through basis on all channels suitable selectors must be added in order that a means for calling in to the attendant may be provided. This signalling or calling circuit is illustrated in Fig. 8 and is arranged for connection in Figs. 1 and 2 as indicated. In general it follows well known signalling systems. It will be observed that the contact tongue 103 (Fig. 1) is normally shunted through a suitable leak resistance to the call signal circuit leads indicated at 154, and also is shunted through the jack 155 and the polar sounder 156. The leads 154 and 254 of Figs. 1 and 2 are arranged to connect with the magnets 801, 802 of Fig. 8. Since the resistance of these windings on the selectors is very small they will practically short-circuit resistances 157 and 257 respectively, the leak current will rise to a predetermined value of about 25 milliamperes. In order to make the selectors which have non-polar magnetic circuits, operate on polar signals, a bias of an arbitrary value, for example about 65 milliamperes and properly poles, is provided from positive source to the windings 803, 804 of the selector arrangement. The contacts 805, 806 of each selector are connected through the windings of corresponding signal relays 807, 808. These signals will then operate one or the other of the relays and light the corresponding lamps 809 or 810 and simultaneously operate relays 807 or 808. Contacts 812 and 813 of each relay serves to close a locking connection to maintain relay 807 or 808 energized. Contacts 814, 815 on either relay serve to close a common alarm system which will call the attention of the attendant to the fact that assistance is needed on the repeater. The attendant puts out the light and stops the alarm by operating release key 820. This removes the ground from the locking circuit and releases whichever relay is operated, returning the circuit to normal. The provision of this circuit enables anyone to call in at the repeater even though all of the circuits are connected together in repeat through position.

While I have described my invention with reference to the embodiments illustrated in the drawings, it should be distinctly understood that this description is merely intended as an illustration of my invention and not a definition of the scope thereof. It is manifest that many changes in the circuit may be made within the spirit of the invention as defined in the appended claims.

What is claimed is:

1. A multiplex repeater for use between two line sections, comprising a multi-channel receiving distributor, an equal multi-channel transmitting distributor, said distributors being operated in synchronism, signal receiving and signal transmitting means at said repeater, and switching means for operatively associating at least one of said channels of said receiving distributor with a selected one of said signal receiving means, and for operatively associating a corresponding one of said signal transmitting means with a corresponding channel of said transmitting distributor.

2. A multiplex repeater for use between two line sections, comprising a receiving distributor having a plurality of segments, means for applying signals from a plurality of channels of one of said line sections to said distributor, a transmitting distributor, means for transmitting a corresponding plurality of channels from said transmitting distributor to the other line section, signal receiving and signal transmitting means at said repeater, switching means for operatively associating the segments for at least one of said received signal channels with a selected one of said signal receiving means, and for operatively associating said transmitter with a corresponding channel of said transmitting distributor, phasing means at said repeater to properly phase the distributor with respect to said received signals, means for operatively associating said phasing means with a predetermined one of said channels, driving means for said distributor, a corrector means for controlling the speed of said driving means to maintain substantial synchronism, and switch means for controlling the effect of said corrector means to change the speed of said driving means for facilitating said phasing.

3. A telegraph repeater for use between two line sections each carrying incoming and outgoing signals comprising, means for receiving and distributing impulses representing a plurality of signal channels incoming from each of two directions, means for transmitting signals representing a corresponding plurality of channels in said two directions, said transmitting means operating synchronously with said receiving means, switching means for terminating selected ones of said received impulses representing a single signal channel at said repeater, and for connecting the other received channels to said means for transmitting, a plurality of telegraph translating means at said repeater, other switching means for operatively associating said terminated channels selectively with respective ones of said translating means.

4. A telegraph repeater for use between two line sections each carrying incoming and outgoing signals comprising means for receiving and distributing groups of impulses representing signals in a plurality of channels incoming from each of two directions, means for transmitting groups of impulses representing a corresponding plurality of channels, switching means movable into a plurality of positions, in one position providing that said received signals are repeated for further transmission in the same direction, in another position, providing that said received signals on any selected channel are terminated at said repeater, phasing means, and switching means for operatively associating said phasing means with a predetermined channel regardless of the position of said first mentioned switching means.

5. A telegraph repeater for use between two line sections each carrying incoming and outgoing signals comprising two receiving distributors each for receiving a series of signal impulses incoming at a predetermined speed from one of two directions over said line sections, said distributors being operated at the same average rate of speed and slightly different instantaneous speed rate than said received signal impulses, a corrector means responsive to a predetermined displacement of less than one signal impulse between said received signals and said distributor, associated with each said receiving distributor for correcting the position of said distributor, switching means for removing one of said corrector means from control by said received signal, means under control of said switching means for increasing or decreasing the speed of said distributor while maintaining operative connection of said other corrector, whereby corrections in the position of said one distributor independently of said corrector means operation may be made in one direction while maintaining communication in the other direction.

6. A multiplex repeater for use between two line sections extending in different directions each carrying incoming and outgoing signals comprising means for receiving and distributing signals representing a plurality of incoming channels from each of two directions, means for transmitting signals representing a corresponding plurality of channels in said two directions of said two line sections, a plurality of telegraph receivers and a plurality of telegraph transmitters at said repeater, switching means for terminating selected ones of said signals representing a single received channel at said repeater, and for operatively connecting said terminated channel to apply signals to a selected one of said receivers, other switching means for connecting a selected one of said transmitters with a single channel of said means for transmitting to correspond with said terminated channel, and means for interconnecting said unterminated incoming channels from both directions with correspondingly directed ones of said means for transmitting, for transmission over a line section beyond said repeater.

7. A telegraph repeater for use between two line sections each carrying incoming and outgoing signals comprising a first means for receiving and synchronously transmitting groups of impulses representing signals in a plurality of channels from one direction, a second means for receiving and synchronously transmitting groups of impulses representing signals in a corresponding plurality of channels in a second direction, means to repeat signals in some of said channels from one line section to the other through said first means, means for repeating signals in corresponding channels from said second to said first line section in the second direction through said second means, switching means for cutting off said repeating means at the repeater and maintaining communication on the remainder of said channels of one line section, and means operative in response to operation of said switching means for transmitting an arbitrary stop signal in said one direction and an idle signal in said second direction on the repeated channels.

8. A multi-channel multiplex telegraph repeater for use between two line sections, comprising means for receiving and retransmitting signals in each of two directions over said line sections to distant operators, for communication, corrector means for variably maintaining said repeater in operation at a speed between definite upper and lower limits, switching means for terminating communication over one of said line sections, maintaining communication between said repeater and said distant operator over said other line section and for simultaneously changing said corrector circuit to establish a speed of operation over said other line section substantially midway between said upper and lower limits, and means responsive to operation of said switching means for transmitting an arbitrary stop signal to said distant operator over said other line section and an idle signal to the distant operator in said one direction.

9. A multiplex telegraph repeater according to claim 8, in which said switching means is provided with a second switching position further comprising means responsive to positioning said switch in said second position for maintaining communication in said other line section between said repeater and said distant operator for re-establishing said corrector circuit and for transmitting an idle signal over said one line section, a phasing means, and means for establishing a connection between a predetermined one of said channels from said one line section and said phasing means, for determining the phase relation of the signals from said one line section with respect to said receiving means.

10. A multi-channel telegraph repeater interconnecting two line sections comprising distributors for receiving signal impulses from each line section, other distributors for transmitting signal impulses over each line section, means for interconnecting portions of said receiving distributors to corresponding portions of said transmitting distributors for repeating signal impulses in selected channels from each line section into the other, terminal receivers and transmitters, means for connecting the remaining portions of said receiving and distributing transmitters to said terminal receivers and transmitters respectively, phase correction means for maintaining the speed of said distributors in substantial synchronism with the received signals from the respective line sections, said correction means operating individually between definite upper and lower speed limits, and switching means for disabling either correction means and simultaneously establishing a speed intermediate the synchronous speed and either the upper or lower speed limit for that line section.

MARK B. KERR.